United States Patent [19]
Alling

[11] Patent Number: 5,255,985
[45] Date of Patent: Oct. 26, 1993

[54] ROLLER BEARING SIGMA CAGE

[75] Inventor: Richard L. Alling, Torrington, Conn.

[73] Assignee: The Torrington Company, Torrington, Conn.

[21] Appl. No.: 977,315

[22] Filed: Nov. 17, 1992

[51] Int. Cl.$^5$ .................... F16C 33/54; F16C 33/46
[52] U.S. Cl. ................... 384/575; 384/580; 384/470
[58] Field of Search .............. 384/470, 572, 575, 576, 384/580

[56] References Cited

U.S. PATENT DOCUMENTS

| | | | |
|---|---|---|---|
| 1,395,244 | 11/1921 | Andre | 384/580 |
| 2,219,031 | 10/1940 | Frauenthal et al. | |
| 2,267,863 | 12/1941 | Hickling | 384/580 X |
| 2,856,246 | 10/1958 | Gaubatz | |
| 3,365,775 | 1/1968 | Cavagnero et al. | 384/575 X |
| 3,881,790 | 5/1975 | Ryanen | |
| 3,913,994 | 10/1975 | Alling et al. | |
| 4,208,078 | 6/1980 | Miki | |
| 4,787,757 | 11/1988 | Finger | |
| 4,824,265 | 4/1989 | Hofmann et al. | |
| 4,932,500 | 6/1990 | Smith et al. | |
| 4,934,841 | 6/1990 | DeVito | |

FOREIGN PATENT DOCUMENTS

| | | | |
|---|---|---|---|
| 2217620 | 8/1990 | Japan | 384/470 |
| 919983 | 2/1963 | United Kingdom | 384/572 |

Primary Examiner—Thomas R. Hannon
Attorney, Agent, or Firm—John C. Bigler

[57] ABSTRACT

A strip of metal is pierced intermediate the edges thereof to form slots for rollers and is bent adjacent the edges to form flanges. Each bend intersects the slots such that the slots wrap around the bends into the flanges. The strip of metal is then formed into a circular hoop such that the flanges form axially spaced end rims to retain the rollers axially. Crossbars between the slots are offset radially in a sigma configuration to retain the rollers radially. Edges of the slots may be specially formed to facilitate flow of lubricant through a roller bearing.

5 Claims, 3 Drawing Sheets

ROLLER BEARING SIGMA CAGE

BACKGROUND OF THE INVENTION

This invention relates generally to roller bearing cages and, more particularly, to roller bearing cages of "sigma" configuration.

Roller bearings commonly employ separators, retainers or cages to maintain separation and alignment of the rollers. Although the terms are frequently used interchangeably, the term "cage" is often used to describe a device that retains the rollers both radially and axially. Thus, a roller bearing cage prevents rollers from moving axially or radially out of the cage, allowing the cage and rollers to be handled as a bearing subassembly.

One particular type of roller bearing cage is known as a sigma cage. As illustrated in FIG. 1, a typical sigma cage 10 has annular end rims 12 and 14 joined together by crossbars 16 to form slots 18 for receiving rollers, not shown. Crossbars 16 have a central portion 20 offset radially inwardly from laterally outward portion 22 and 24 such that, when viewed in cross-section, end rims 12 and 14 and crossbars 16 resemble the Greek letter "sigma."

End rims 12 and 14 extend axially toward each other with cylindrical portions 26 and 28, respectively. Cylindrical portions 26 and 28 provide end surfaces of slots 18 such that axial movement of the rollers is restricted. Edge surfaces on central portion 20 prevent radially inward movement of the rollers and edge surfaces of laterally outward portions 22 and 24 prevent radially outward movement of the rollers.

The maximum load carrying capacity of such sigma cages is limited by the restricted roller length. The crossbars have limited elasticity and cause distress to the rollers during insertion into the cage. Also, lubrication flow is restricted by the continuous radially oriented surfaces of the end rims. And, fatigue strength is reduced by the corners of the slots and the tight end rim corner radius, which increase the stress concentration factor.

Manufacture of such sigma cages usually requires a rolling mill and high cost scissor blank cutoff tooling. Welding of the end rims requires a subsequent flange surface grind operation. Also, piercing of the slots creates burrs that must be removed by grinding, tumbling or other metal finishing operations to provide conformity to a pilot raceway surface. And, a special multislide wrap mechanism, blank rotator, or post pierced stock twister may be required.

The foregoing illustrates limitations known to exist in present roller bearing cages of sigma configuration. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a method for forming a roller bearing cage with wrap-around slots. A strip of metal having a first side and a second side and two edges is pierced intermediate the edges thereof to form slots for rollers. The pierced strip of metal is then bent adjacent the two edges thereof to form first and second flanges, each bend intersecting the slots such that the slots wrap around the bends into the first and second flanges. The pierced and bent strip of metal is then formed into a circular hoop such that the flanges form axially spaced apart end rims for retaining the rollers in the axial direction.

The foregoing and other aspects will become apparent from the following detailed description of the invention when considered in conjunction with the accompanying drawing FIGURES.

BRIEF DESCRIPTION OF THE DRAWING FIGURES

DETAILED DESCRIPTION

Figure 2:
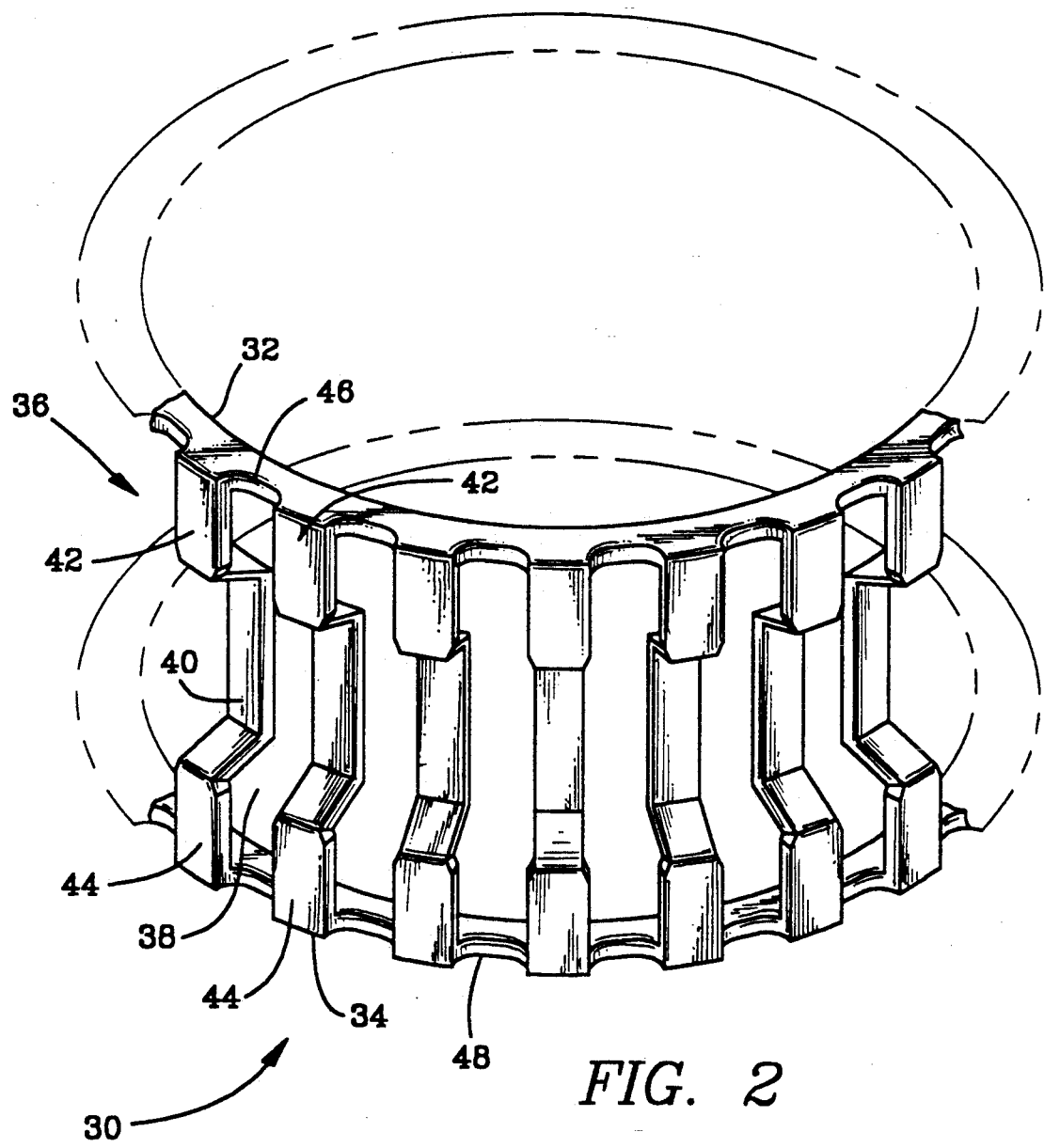
FIG. 2 is an isometric view illustrating an embodiment of the roller bearing sigma cage of the present invention.

Referring now to the drawings, FIG. 2 illustrates a roller bearing sigma cage 30 of the present invention having annular end rims 32 and 34 joined together by crossbars 36 to form slots 38 for receiving rollers, not shown. Crossbars 36 have a central portion 40 offset radially inwardly from laterally outward portions 42 and 44. Cage 30 is considered a sigma cage because end rims 32 and 34 and crossbars 36 suggest the Greek letter "sigma" when the cage is viewed in cross-section.

Figure 1:
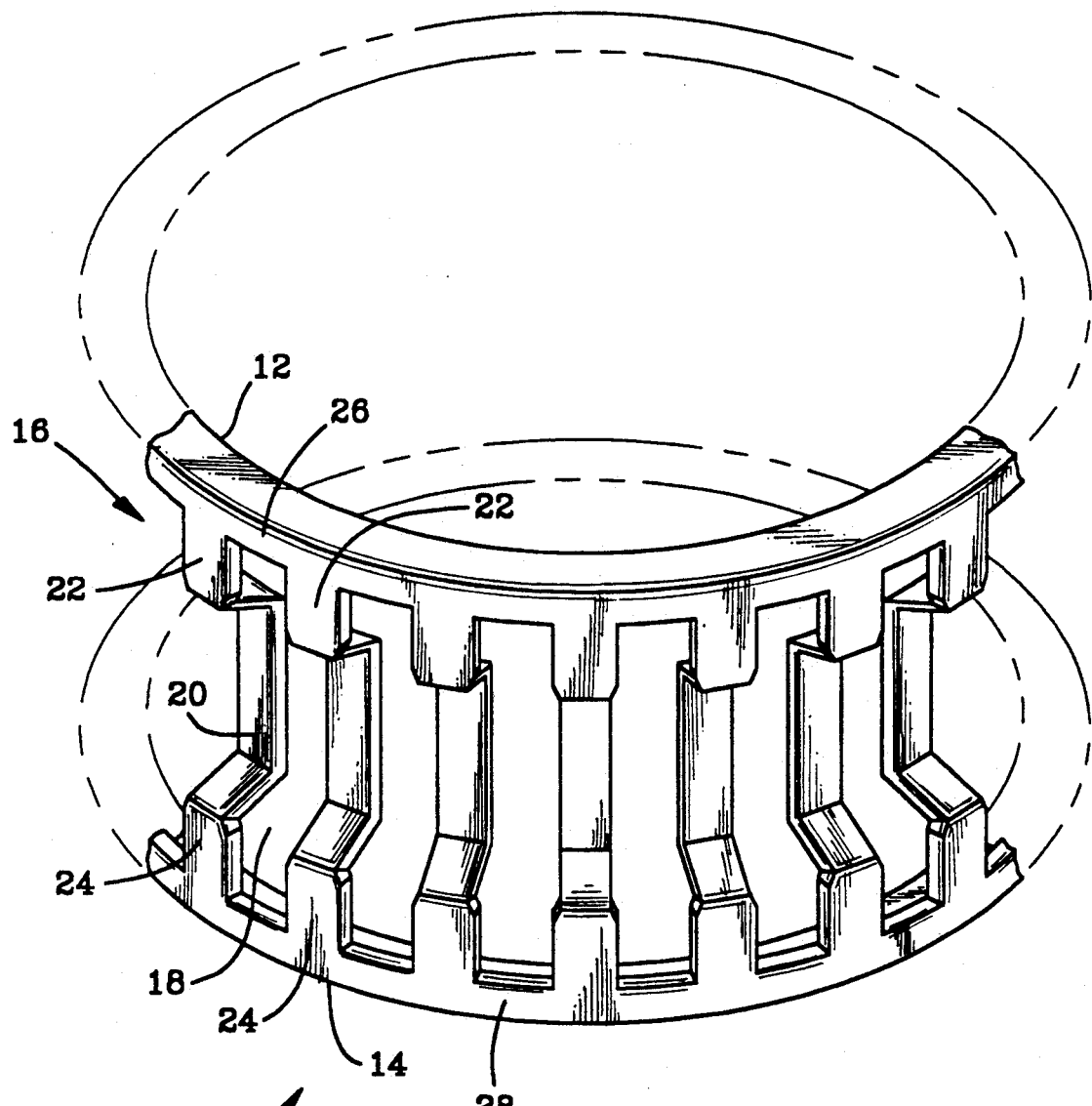
FIG. 1 is an isometric view illustrating a prior art roller bearing sigma cage.

End rims 32 and 34 do not extend axially toward each other with surfaces similar to cylindrical portions 26 and 28 of FIG. 1. Instead, notches 46 and 48 within end rims 32 and 34, respectively, provide end surfaces of slots 38 such that slots 38 wrap around a radius joining the end rims and crossbars 36. As a result, the notches can be radiused, unlike the corners of slots 18, thereby increasing fatigue strength of the cage. Axial movement of the rollers is restricted by engagement of radially oriented surfaces of end rims 32 and 34.

Figure 3:
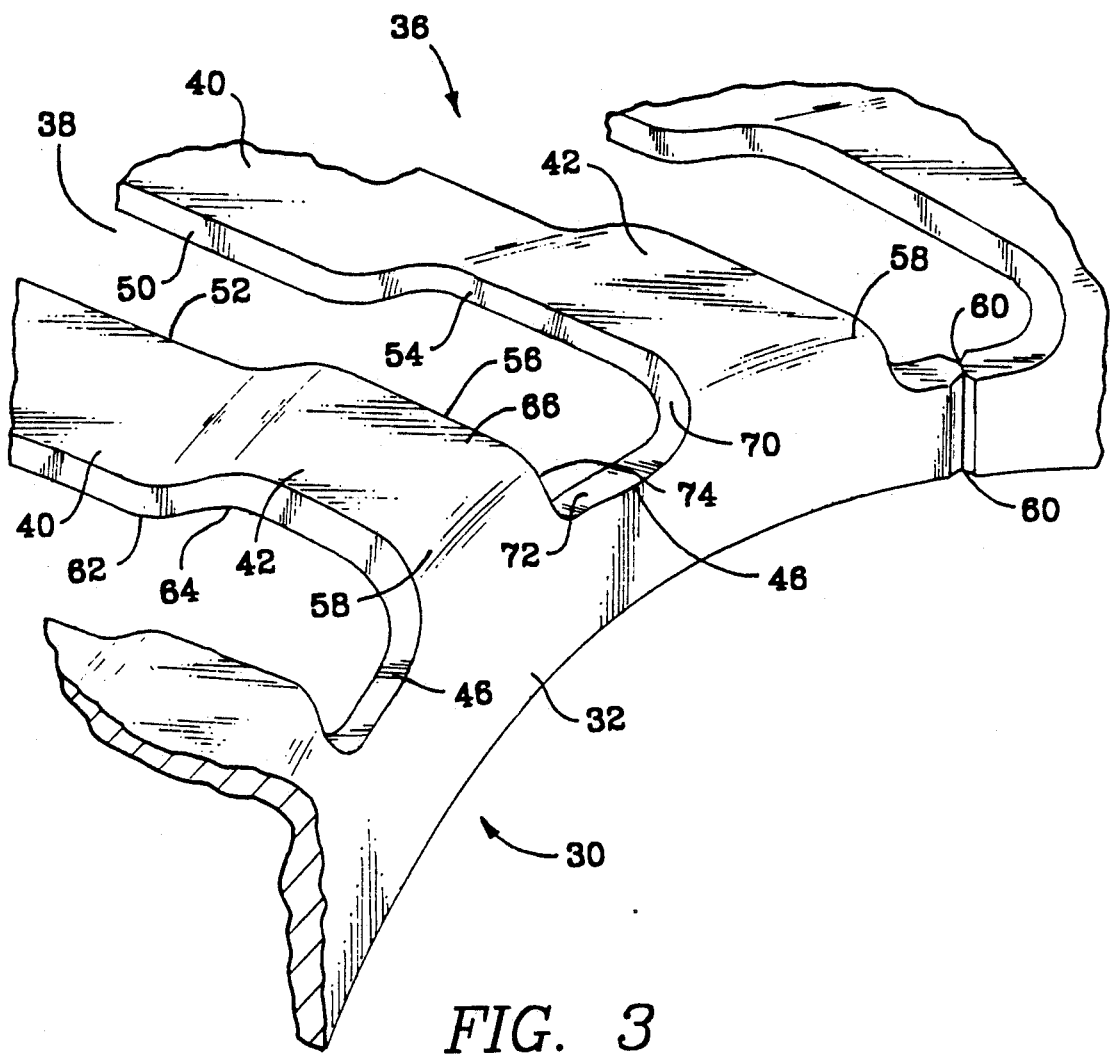
FIG. 3 is an enlarged pictorial view of a portion of the roller bearing sigma cage of FIG. 2.

As indicated in FIG. 3, edge surfaces 50 and 52 of central portion 40 prevent radially inward movement of the rollers, and edge surfaces 54 and 56 of laterally outward portions 42 and 44 prevent radially outward movement of the rollers. Because slots 38 wrap around and extend into radially oriented surfaces of end rims 32 and 34, the rollers extend all the way to the flanges of the end rims. As a result, longer rollers can be installed than in sigma cage 10 of a similar size, thereby increasing the load carrying capacity for a bearing of a given size.

Sigma cage 30 results in improved lubrication flow through the cage because slots 38 wrap around into notches 46 and 48 of end rims 32 and 34. Unlike end rims 12 and 14 of sigma cage 10, end rims 32 and 34 of sigma cage 30 present a discontinuous outside diameter pilot surface, facilitating the flow of lubricant past the cage to the rollers. Also, the elasticity and fatigue strength of crossbars 36 is improved due to a reduced stress concentration factor provided by the wraparound slot configuration.

Numerous manufacturing advantages are afforded by sigma cage 30. The cage can be made from a flat strip of metal that is partially formed, multiple slot pierced, bent adjacent edges of the metal strip to form flanges, cut to length, wrapped to form a hoop, and welded, all those operations being within a multislide machine. A simplified vertical cutoff operation within the multislide machine can blockcut the strip of metal and provide radially chamfered surfaces 60 of end rims 32 and 34.

Chamfered surfaces 60 are of appropriate size to contain a weld puddle melt flow without resolidification beyond adjacent inside and outside surfaces of the end rims. This feature eliminates the need for the flange surface grind operation required to remove a projecting weld flash-out common with conventional sigma cage cutoff and welding procedures. Chamfered surfaces 60 may be on the inside surface or outside surface of end rims 32 and 34, or on both surfaces.

Preferably, slot piercing of the strip of metal is done from the outside in, that is, from the radially outward surface of crossbars 36 toward the rollers and radially inwardly offset central portions 40 of crossbars 36. That direction of piercing ensures that any resulting burrs will not be on the surface of sigma cage 30 that pilots on a raceway surface. This feature eliminates the previous requirement to remove burrs by grinding, tumbling or other metal finishing operations.

In addition, a waffling coin or similar tool can be applied to curved surface 58 or to angled portions 62 and 64 or end portions 66 of crossbars 36 to "preradius" the laterally outward portions 42 while the partially formed strip of metal is in a linear or flat condition. Such waffling may generate improved crossbar conformity to the rollers and pilot raceway surface and may improve crossbar fatigue strength. The strip of metal is formed into a hoop by a wrap down mechanism within the multislide machine, minimizing rim distortion.

The blend radius between the flanges of end rims 32 and 34 and crossbars 36 can be designed to provide a sufficiently high strength flange to crossbar attachment and a smooth inertia transition gradient from the uncut to the notched flange zones. Preferably the process sequence includes a roll or press station to form a center cage relief; a press station with a multiple slot pierce; a press station to form flanges, waffle crossbars and coin; a vertical press ram block cutoff forming the corner chamfers; and a slide wrap down and around a center mandrel with a resistance weld at the 6 o'clock position.

The present invention is also applicable to a reversed configuration sigma cage, not illustrated. In that configuration, the inside diameter of the crossbars is piloted on a bearing race surface, and the flanges of the end rims and central portion 40 extend radially outwardly from the laterally outward portions of the crossbars. As with the previously described embodiment, the slots for the rollers are pierced in a direction toward the rollers and away from the piloting surface to eliminate the need for grinding, tumbling or other burr removal.

The edges of slots 36 may be specially formed in the multi-slide machine to perform as blades to deflect lubricant either toward or away from the rollers. This forming may take place after the lot piercing, before or during reforming operations. When in operation, a bearing cage rotates, actually being driven by the rollers. As a result, the modified sigma cage not only permits improved lubricant flow through the bearing but also encourages such flow by pushing the lubricant in the desired direction.

The specially formed surfaces of slots 36 described above may be provided in area 70 of notches 46 and 48 (the lateral extreme of the cage outside diameter pilot surface), in bottom surface 72, and in area 74 (also at the lateral extreme of the pilot surface). These areas, indicated in FIG. 3, may be straight ramps, angled ramps, or may be otherwise configured. Preferably, these surfaces are formed by a coining tool applied in a direction opposite that of the piercing tool.

The present invention provides a roller bearing sigma cage that affords maximum load carrying capacity since roller slots are not terminated inboard of the cage flanges. Improved lubrication flow through the cage is provided by the slots that wrap into the end rims. Fatigue strength is enhanced and distress to the rollers during insertion into the cage is reduced. Numerous manufacturing advantages result in significantly lower cost.

Having described the invention, what is claimed is:

1. A roller bearing cage of sigma configuration, comprising:

annular first and second end rims, the end rims being axially spaced apart with respect to a common axis, each of the end rims having a surface aligned radially with respect to said axis and notches within said radially aligned surface corresponding to locations of rollers; and crossbars joining the first end rim with the second end rim at locations between the notches, the crossbars and end rims forming slots for accommodating the rollers, the slots wrapping into the notches of the end rims, the crossbars having a central portion and laterally outward poriton, the central portion being offset radially with respect to the laterally outward portions such that a roller within one of said slots is retained in the radial direction by engagement with the central portion and laterally outward portion, the end rims, central portion and laterally outward portions comprising a sigma configuration.

2. The roller bearing cage according to claim 1, wherein the end rims and cross bars are formed from a single sheet of metal and have substantially the same thickness.

3. The roller bearing cage according to claim 2, wherein the juncture of the end rims and crossbars is radiused, the slots wrapping over the radiused juncture of the end rims and crossbars into the radially aligned surfaces of the end rims.

4. The roller bearing cage according to claim 1, wherein the end rims have an angled surface within said radially aligned surface forming a portion of said notches for deflecting lubricant into or out of the slots formed by the end rims and crossbars.

5. The roller bearing cage according to claim 1, wherein the notches formed within said radially aligned surface of the end rims have a radiused configuration in a radial plane providing a rounded end opening of the slots formed by the end rims and crossbars.

* * * * *